D. A. GORHAM.
Whiffletree.
No. 57,497.
Patented Aug. 28, 1866.
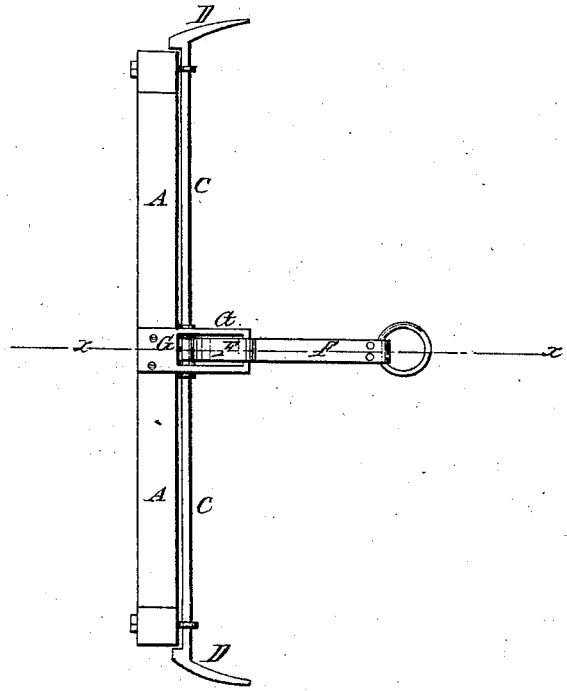
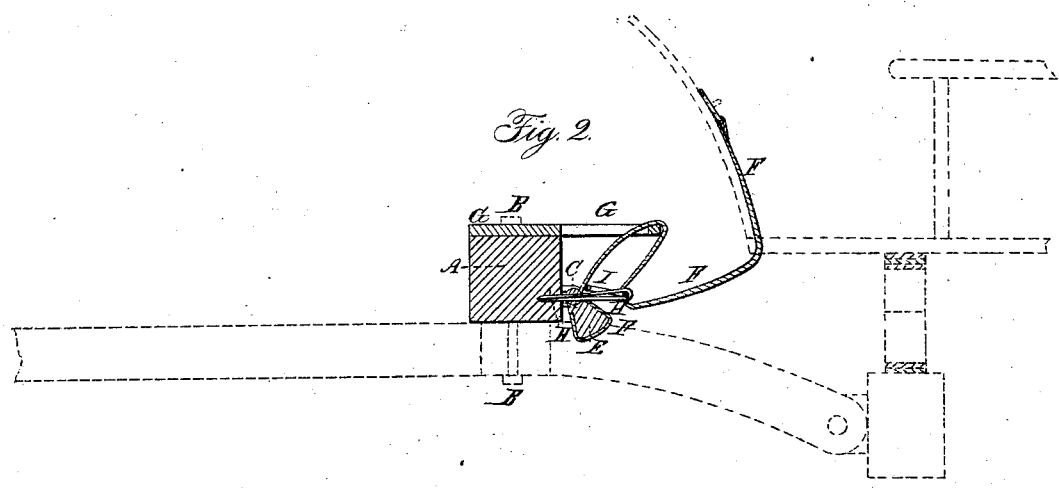
Witnesses:
Inventor:

UNITED STATES PATENT OFFICE.

D. A. GORHAM, OF LAWRENCE, MASSACHUSETTS.

IMPROVEMENT IN WHIFFLETREES.

Specification forming part of Letters Patent No. 57,497, dated August 28, 1866.

*To all whom it may concern:*

Be it known that I, D. A. GORHAM, of Lawrence, Essex county, State of Massachusetts, have invented a new and useful Improvement in Whiffletrees; and I do hereby declare that the following is a full, clear, and exact description thereof, which will enable others skilled in the art to make and use the same, reference being had to the accompanying drawings, forming part of this specification, in which—

Figure 1 is a top view of my improved whiffletree. Fig. 2 is a vertical section of the same, taken through the line $x\ x$, Fig. 1, and showing in red lines the relative position of the thills and dash-board of the wagon.

Similar letters of reference indicate like parts.

My invention has for its object to furnish an improved whiffletree, by means of which the horse may be attached to the wagon in such a way that in case of accident he may be immediately released therefrom; and it consists, first, of the revolving trace-hooks and connecting bar or rod, constructed as described, in combination with the whiffletree; second, in connecting the whiffletree to the fore part of the carriage in such a way that the horse can be released from the carriage in an instant whenever necessary; and, third, in the strap, bar, lever, and spring-pin, by means of which the whiffletree is operated and connected with the forward part of the carriage, as hereinafter more fully described.

A is the whiffletree, which is pivoted to the cross-bar of the thills by a bolt, B, in the usual manner, as shown in red in Fig. 2.

To the rear side of the whiffletree A is attached a rod or bar, C, by passing it through staples or the perforated heads of bolts, as shown in Fig. 1. Upon the ends of this rod C are formed hooks D, so constructed that when the hooks are in the position represented in Fig. 1 the eyes or rings of the traces will be held safely connected to the whiffletree; but when the hooks are revolved the draft will come upon the inclined side of the hook, and the traces will become free from the whiffletree.

Upon the under side of the central part of the rod or bar C is formed a projection or lever, E, the end of which is made so heavy that it will hold the rod or bar G in the position represented in Fig. 1 until said projection or lever is lifted up. To the under side of this lever E is attached the end of a strap, F, which passes over the end of the lever E, and then up through the slot in the bar G attached to the upper side of the whiffletree A, as shown in Figs. 1 and 2.

H is a spring-pin, formed by bending a piece of steel or other suitable material over upon itself in such a way that when the ends are pressed together it will form a pin, which will press against the sides of the hole in which it may be placed and prevent it from dropping or jarring out.

To the end or head of the pin H is attached a ring, I, through which is passed the end of the strap F. The pin H is then passed through the strap twice and through the lever E and into a hole in the whiffletree A, as shown in Fig. 2, making it impossible for the rod and hooks to turn till the pin is drawn. The strap F is then passed through or below the dash-board into the forward end of the carriage, and secured within convenient reach of the driver by a ring attached to the strap. By pulling upon the end of the strap the first effect is to draw the pin H from its place. The end of the lever E is then raised, which revolves the hooks D and releases the horse from the carriage.

The pin is for the express purpose of holding the rod in position.

You will find by trial with a string or strap that the beveled shoe opposite the hooks will always push the traces off the hooks. The shoe will begin to crowd the traces as soon as the rod commences to turn. Then, again, this shoe fills the trace-slot full in the big whiffletree, serving to keep it from playing or shoving off when the traces are slack.

I claim as new and desire to secure by Letters Patent—

1. The revolving trace-hooks D and rod or bar C, constructed as described, in combination with the whiffletree A, substantially as described, and for the purpose set forth.

2. Connecting the whiffletree A to the forward part of the carriage in such a way that the horse can be released from the carriage in an instant whenever necessary, substantially as described, and for the purpose set forth.

3. The spring-pin H, constructed as described, in combination with the strap F, slotted bar G, and lever E, substantially as and for the purpose set forth.

D. A. GORHAM.

Witnesses:
T. W. GORHAM,
LEVI GORHAM.